Feb. 21, 1950    R. GONDAR    2,498,414
COLLAPSIBLE LOADING AND STORING DEVICE
Filed May 10, 1945    3 Sheets-Sheet 1
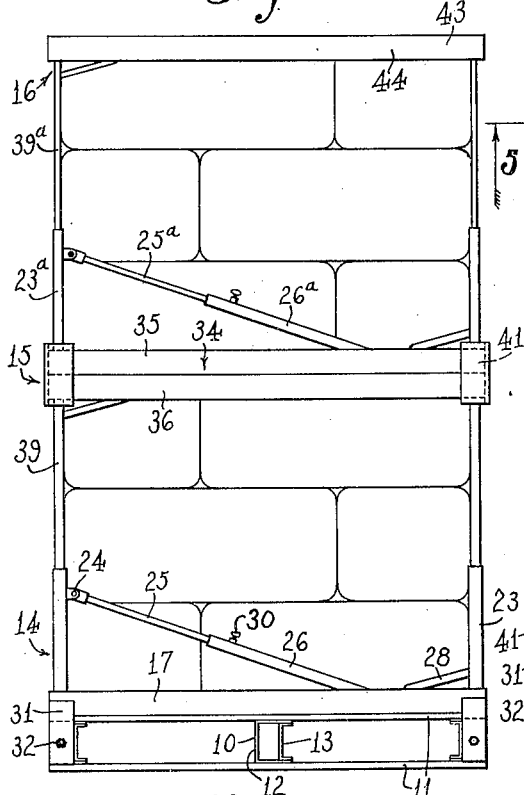
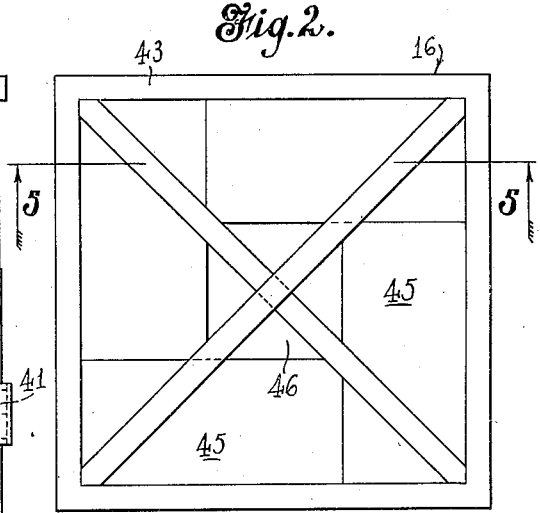
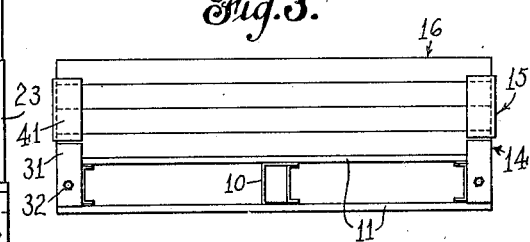
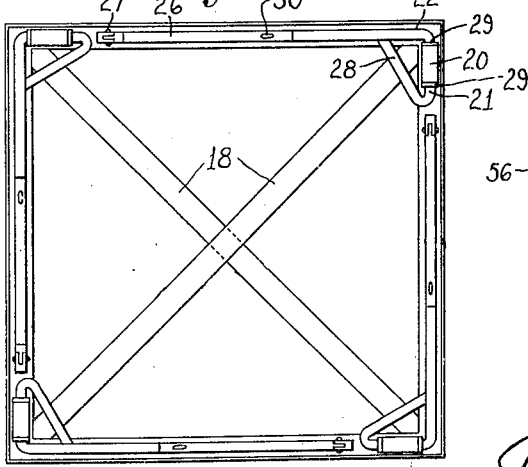
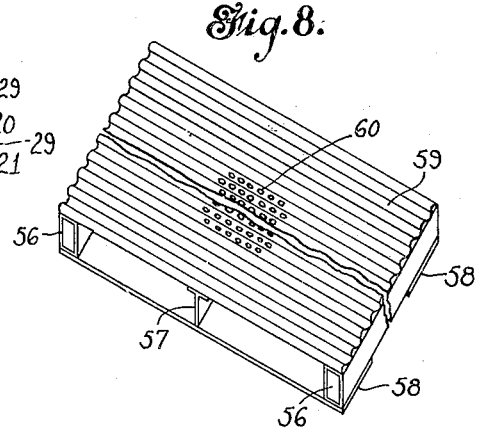
Inventor
Rudolph Gondar
By Rockwell & Bartholow
Attorneys

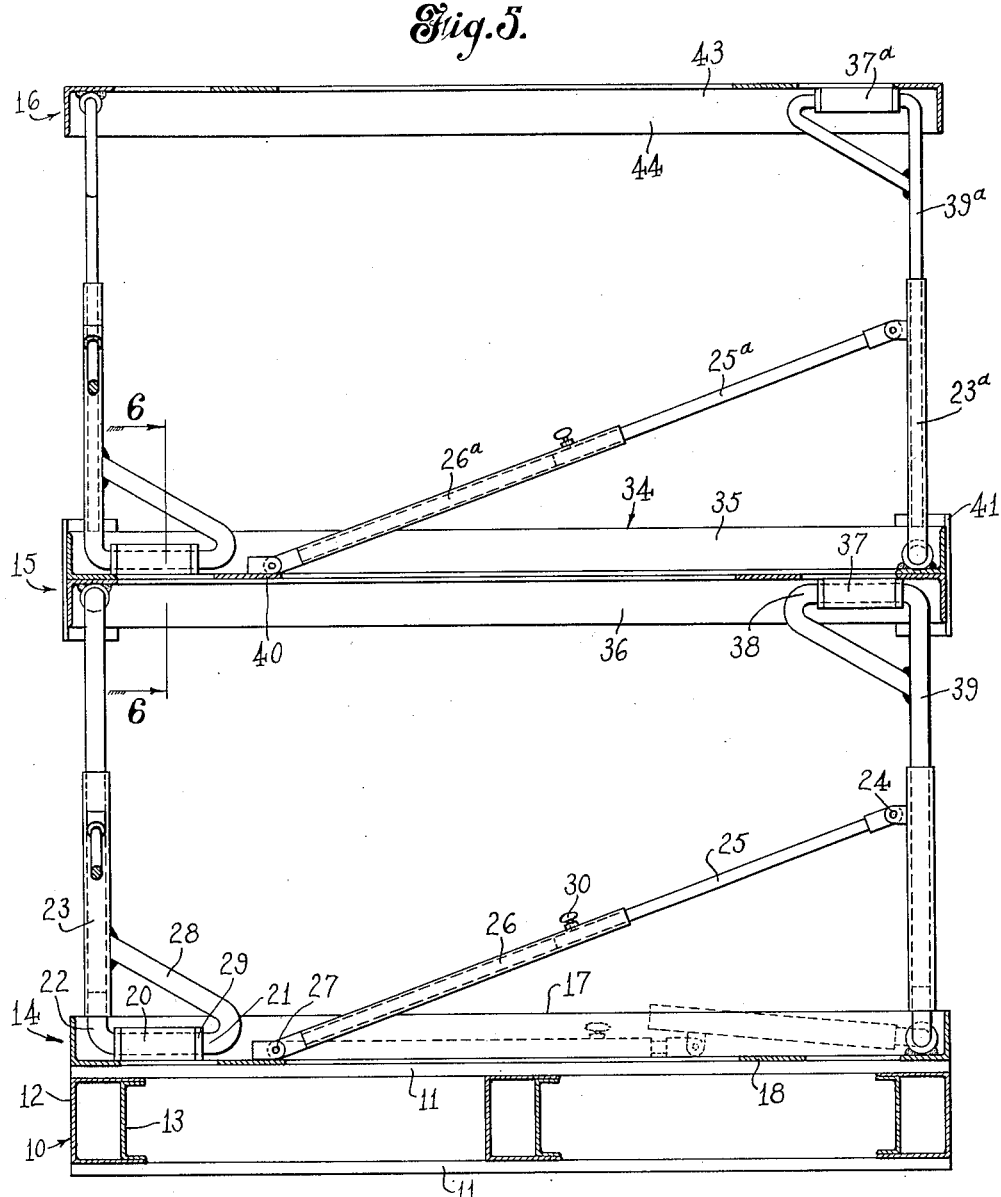
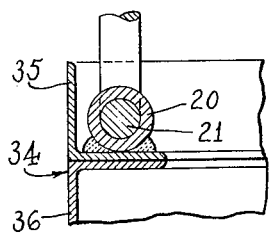

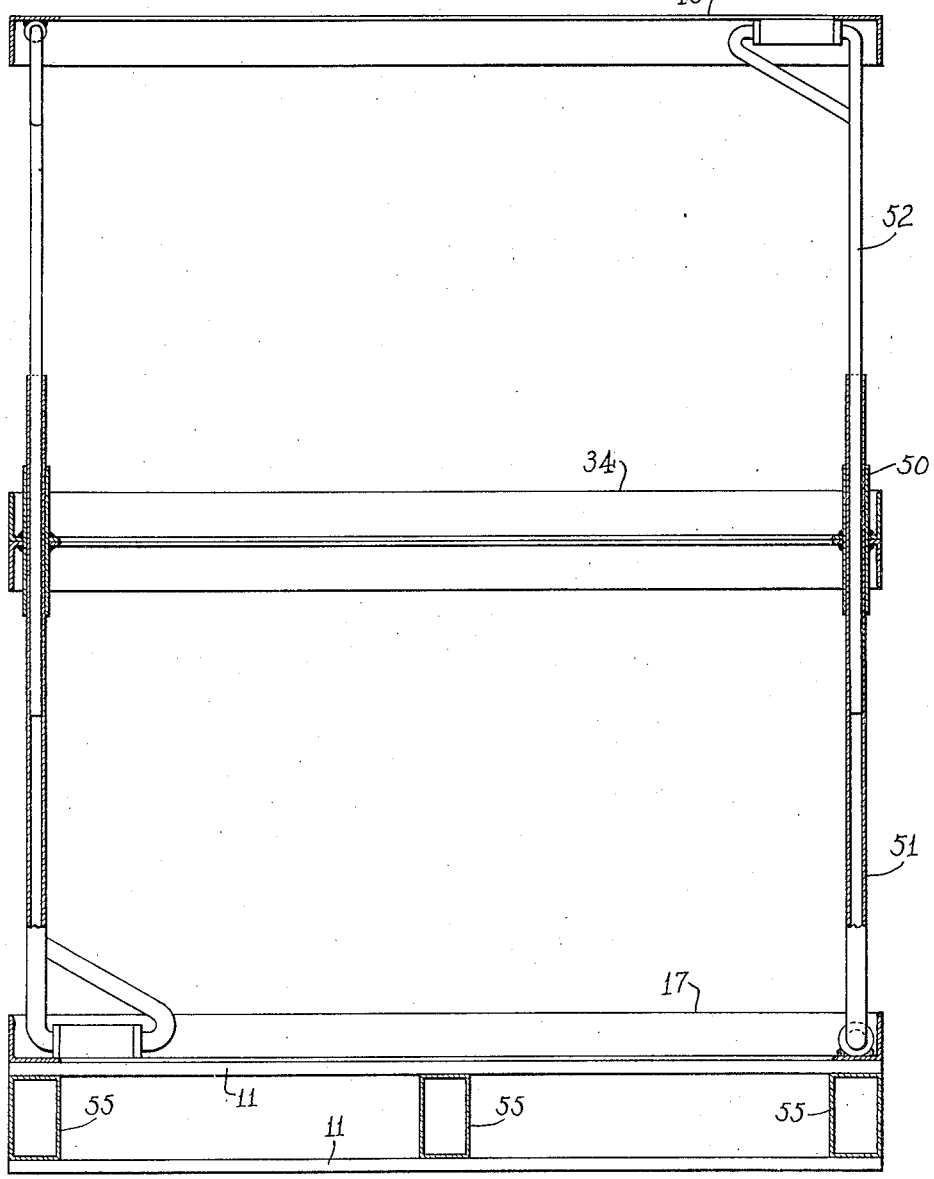

Patented Feb. 21, 1950

2,498,414

UNITED STATES PATENT OFFICE 2,498,414

COLLAPSIBLE LOADING AND STORING DEVICE

Rudolph Gondar, Stratford, Conn.

Application May 10, 1945, Serial No. 593,033

10 Claims. (Cl. 220—8)

1

This invention relates to a collapsible loading and storing device, and more particularly to what may be termed a crate or container for handling, shipping or transporting articles or materials, which articles are of such a nature or which are cased or boxed in such form that they may be stacked in tiers and securely held in place within the crate or container, so that the entire load may be readily handled by well-known loading and handling devices such as fork-lift trucks or the like.

As illustrated and described, I have shown my device as applied to the handling of blocks or slabs of rubber, but it will be understood that it is applicable to the handling of other materials as well.

In the handling of slabs or rubber at the present time, and particular blocks or slabs of synthetic rubber, each slab is placed in a paper bag and is handled individually. I contemplate by the present invention providing a collapsible crate or container in which a plurality of such blocks or cakes of rubber may be stacked and held in place, so that the entire load in one container may be loaded and transported without rehandling. The container or crate is of skeleton form, so that when it has been unloaded, it may be collapsed and returned to the shipper, so that it may be used again. As shown, the collapsible container or crate may be supported or placed upon a platform or pallet, the latter being so constructed so that it may be readily handled by well-known means such as fork-lift trucks, for example.

In handling cakes or slabs of synthetic rubber by my method, it will be unnecessary for each cake of rubber to be placed in a paper bag, thus effecting a considerable saving both in labor and paper. Moreover, the cakes do not have to be handled individually, but a plurality of them, 24 or more, for example, may be stacked in a single container and handled as a unit during transportation of the material and, if desired, also during the storage thereof.

As is well known, synthetic rubber when first manufactured has a tendency to shrink, and the device which I have constructed is so designed as to permit such shrinkage and, at the same time, hold the cakes securely in place so that they will not slip off the pallet upon which they are carried. Moreover, the device is of skeleton form so that it will be of relatively simple construction and light weight, thus rendering it economical to construct and also economical to ship or transport, both when loaded and when being returned in collapsed condition to the original shipper.

One object of the invention is to provide a novel form of crate or container for storing, handling and transporting materials in cases, slabs or cakes which may be stacked one upon the other.

A further object of the invention is to provide

2 a collapsible container or crate for containing articles to be handled or stored, which container will be of relatively simple construction and so arranged that it may be collapsed into a relatively small space for return shipment when it is empty.

Still another object of the invention is to provide a crate or container of sturdy and simple construction and which will, at the same time, be contractable to take up any shrinkage which might occur in the materials stored within it, and the parts of which may be readily disassembled for unloading and collapsed into compact form for reshipment when emptied.

To these and other ends the invention consists in the novel features and combinations of parts to be hereinafter described and claimed.

In the accompanying drawings:

Fig. 1 is a side elevational view of a collapsible crate or container embodying my invention, the device being shown as containing a plurality of cakes or slabs of synthetic rubber;

Fig. 2 is a top plan view of the device shown in Fig. 1;

Fig. 3 is a side elevational view of the device when empty and in a collapsed condition;

Fig. 4 is a top plan view of the lower section of the device when the upright corner members are folded in place;

Fig. 5 is a sectional view on line 5—5 of Fig. 2;

Fig. 6 is an enlarged detail sectional view on line 6—6 of Fig. 1;

Fig. 7 is a view similar to Fig. 5 showing a modified form of my device;

Fig. 8 is a perspective view of a pallet of modified form; and

Fig. 9 is a side elevational view of another form of pallet.

To illustrate a preferred embodiment of my invention, I have shown in Figs. 1 to 6 of the drawings a base or supporting member usually called a pallet having a collapsible crate or container resting thereupon. As shown, this container, as will be hereinafter more fully described, consists of three sections, a lower or base section, an intermediate section, and a top or upper section.

The pallet may be of any preferred construction but, as shown herein, consists of a plurality of stringer elements 10, three in number as shown, arranged in parallel relation and having cross slats 11 secured to the upper and lower surfaces thereof to form a base below the stringers and a platform above the stringers.

As shown, the stringer elements 10 may comprise a pair of channel members 12 and 13, the latter being nested within the former as shown in Fig. 5 to form a hollow member of rigid construction and of relatively light weight. These stringer members are arranged in parallel relation as are the transverse members 11, so as to form a rigid base or support for the heavy load which they are designed to carry.

As previously stated, the collapsible container or crate supported upon the pallet is formed in three sections, a lower section designated generally by the numeral 14, an intermediate section 15 and an upper section 16. The lower section comprises a rectangular base portion 17 of angle iron construction and of open formation, the four sides of which may be held rigidly together by the diagonal braces 18 which may have their ends welded to the hollow frame 17. Adjacent each corner of the frame 17 is welded a collar or sleeve 20 within which is rotatably mounted one leg 21 of a member 22 of substantially triangular shape. To one end of the member 22 is secured a tubular member 23 to which is pivoted at 24 a rod 25 designed to be telescopically received in a tubular member 26 pivoted at 27 to one side of the frame 17. The third arm 28 of the member 22 may also be secured to the tubular member 23 to increase the rigidity of the construction, and collars 29 may be welded to the leg 21 on each side of the tubular member 20 to prevent any play of the member 22 within the tube 20.

With the above construction it will be seen that the members 23 may be extended to a vertical position with respect to the frame 17 as shown in Figs. 1 and 5, or may be folded to a substantially horizontal position within the frame 17 as shown in Fig. 4 and as shown in dotted lines in Fig. 5. When the tubular members 23 are in their vertically extended position, they are rigidly held in this position by the rod 25 and the tubular member 26, and the latter may be provided with a set screw 30 to retain the parts in this position. By loosening the set screw, the rod 25 will be permitted to telescope within the tube 26 and permit the folding of the parts to the dotted line position shown in Fig. 5, the leg 21 rotating within the sleeve 20.

In order that the container may be held securely upon the base or pallet, a plate 31 may be welded at each corner of the frame 17, which plates may be secured to the pallet by retaining bolts 32. Thus the lower section 14 of the device will be rigidly secured to the pallet for handling.

The central section 15 of the device comprises an open rectangular frame member 34 which preferably consists of two sections constructed similarly to the member 17 and placed back to back, so that it will be provided with upwardly extending flanges 35 and downwardly extending flanges 36, each of these flanges being constituted by one side of the angle irons of which the frame member is constructed. As shown more especially in Fig. 5, for example, collars 37 are secured at the lower side of the member 34, within which collars are rotatably mounted the triangular base portions 38 of downwardly extending rods 39, there being one of these assemblies at each corner of the device, and the rods 39 being adapted to be telescopically received within the tubular members 23 when the device is assembled. It will also be understood that this intermediate section of the device is provided with cross braces 40 similar to the cross braces 18. It will also be understood that the members 39 may be folded against the section 34 so that they will lie within the outline of the flanges 36 when the device is in collapsed condition shown in Fig. 3. Also, at each corner of the section 34, angle plates 41 may be secured exteriorly of the frame section, which angular plates are adapted when the device is collapsed as shown in Fig. 3 to overlap the frame 17 so as to hold the parts of the container in assembled relation.

On the upper side of the intermediate section 34 are pivoted tubular members 23ᵃ constructed similar to the members 23 and pivotally secured in the same manner. These members, it will be understood, may be folded downwardly within the flange 35 or may be held in a vertical position as shown in Fig. 5 by the tubular member 26ᵃ and the rod 25ᵃ which telescopes therein, these members being constructed similarly to their counterparts 25 and 26 already described. It will be understood that there will be one of the members 23ᵃ at each corner of the device as described in connection with the base section 17.

The upper member 16 of the container comprises a top section 43 similar to the base section 17 but in inverted relation with respect to the base section, so that the flanges 44 of the top section project downwarly. At each corner of this section a rod 39ᵃ is pivotally mounted in a collar 37ᵃ similar to the rods 39 and collar 37 previously described, so that these rods may swing to a folded position within the flanges 44 or may assume a vertical position as shown in Fig. 5. It will be understood that the rods 39 and 39ᵃ are not provided with bracing members such as the members 25 and 26, as these rods are held in their vertical positions by being telescoped within the tubes 23 and 23ᵃ.

In the use of my device, the lower section 14 will be placed upon the pallet 10 and secured by the bolts 32. The cakes or slabs of rubber may then be placed upon this section, the material resting upon the upper platform 11 of the pallet. In Figs. 1 and 2 of the drawings I have shown four cakes of rubber 45 arranged within the frame 17 in staggered relation as shown, so as to leave an opening 46 in the center for purposes of ventilation. As shown, the frame 17 is of such dimensions that each side of the frame is of a length equal to the sum of the length and the width of one of the rubber cakes so that they may snugly nest within the frame as shown in Fig. 2. It will be understood that the tubular members 23 are in their upright or extended positions when the rubber cakes are placed within the frame.

When the desired number of tiers of rubber cakes, three for example, have been placed one on top of the other, the intermediate section 15 is put in place with the rods 39 telescoped within the tubular members 23, the cross braces 40 of this frame resting upon the upper surface of the material. The tubular members 23ᵃ are then extended and more material, for example, another three tiers, is piled upon the intermediate frame 15. The upper section 16 is then put in place with the rods 39ᵃ telescoping within the tubular members 23ᵃ.

It will be seen that the edges of the rubber blocks will lie within the flanges 36 and 44 of the frame members, and as the latter are held against side sway by the telescopic fitting of the rods 39 and 39ᵃ in the tubes 23 and 23ᵃ, the entire load will be secured against shifting on the pallet 10. It will also be understood that as the rubber shrinks, the rods 39 and 39ᵃ will simply telescope to a greater extent within the tubes 23 and 23ᵃ so as to take up this shrinkage and at all times hold the rubber cakes in compact relation, so that the entire load may be readily handled as a unit without danger of any of the cakes becoming detached or slipping out. The members 23 and 39 and 23ᵃ and 39ᵃ provide in effect extensible and contractable connections between the intermediate section and the upper and lower sections or frames to permit this operation. Also the members 25 and 26 and 25ᵃ and 26a provide extensible and contractable brace members to hold the tubular members 23 and 23a in their vertical directions or to permit them to fold closely against the frame members to which they are pivoted.

When it is desired to empty the container and return it to the shipper, the upper section 44 is lifted from the intermediate section and the rods or legs 39a folded within the flanges 44. The cakes of rubber will then be removed from above the intermediate section 15 and it is then lifted from the lower section, the tubular members 23a and the rods 39 being folded against the frame within the flanges 35 and 36. When the cakes of rubber are removed from the lower section, the tubular leg members 23 will likewise be folded against the lower frame section, and the intermediate and upper sections will then superpose on the lower section, as shown in Fig. 3, the flanges of the three sections abutting each other and enclosing the folded leg members. The angle plates 41 secured to the intermediate section 15 will overlap the frame members 17 and 43, and thus hold the parts in assembled relation. It will be apparent that the container in this knocked-down condition occupies a very small space, and together with the pallet 10 may be returned to the shipper in compact form.

In Fig. 7 of the drawings I have shown a somewhat modified form of my invention wherein the intermediate frame member 34 is provided at the corner portions thereof with rigid tubular members 50 open at both ends. The lower frame member 17 is provided with pivoted tubular members 51 similar to the members 23, these members, however, being of the proper outside diameter to fit snugly within the tubular members 50. The upper frame member 43 is provided with pivoted rods 52 which telescope snugly within the tubular legs 51, these legs being sufficiently long to extend through the sleeve or tubes 50.

With this construction, it will be seen that it is not necessary to provide the extensible braces such as the members 25 and 26 shown in Fig. 5 as the members 51 and 52 will be rigidly held in vertical position by engagement with the sleeve 50 and by the telescopic arrangement of the members 51 and 52. Aside from this change, the container shown in Fig. 7 is similar to that shown in Figs. 1 to 6 of the drawing.

This form of my invention shown in Fig. 7 is somewhat simpler than the form of my invention shown in Figs. 1 to 6, due to the omission of the braces. It will also be apparent that the three sections of the container may be nested together as before, as the members 51 and 52 are folded against the frame sections to which they are pivoted, and the sleeve 50 will lie within the abutting flanges of the frame sections. In this connection it will be noted that the portions of the sleeve 50 projecting above and below the flanges of the section 34 are sufficiently short so that they will lie within the vertical flanges of the frames 17 and 43.

It may also be noted that the intermediate section 15 of the device as shown in Fig. 5 is substantially a combination of the upper and lower sections 14 and 16 with that part which corresponds to the lower section at its upper side and the part that corresponds to the upper section at its lower side. With this construction it will be seen that as many sections as desired may be employed one on top of the other with the use of a plurality of the intermediate sections.

As shown in Fig. 7 of the drawings, the stringers 55 of the pallet which support the collapsible container are of hollow rectangular design, and three of such stringers are used in parallel relation to which are connected the upper and lower cross slats 11. In Fig. 8 of the drawing I have shown a modified form of pallet in which the two end stringers 56 are of hollow rectangular form, and the middle stringer 57 comprises a T beam. To the lower surfaces of these stringers are secured metal slats or plates 58, while the platform at the upper side of the stringers comprises a corrugated sheet metal plate 59. This plate may be perforated as shown at 60 so as to admit air to the space 46 at the center of the pile of rubber blocks as shown in Fig. 2. The pallet shown in Fig. 8 is constructed entirely of metal, and, while it may be made of members of relatively light weight, is extremely strong and durable.

In Fig. 9 of the drawings I have shown a form of pallet in which the stringers 61 consist of angle beams disposed as illustrated with the horizontal portions of the end beams directed inwardly. The upper face 62 of the pallet may comprise a corrugated plate similar to that illustrated at 59 in Fig. 8, while the lower face may consist of a plurality of metal plates 63, these members being secured to the angle irons in any well-known way, such as welding, for example. It will also be understood that the members 58 and 59 of Fig. 8 may be welded to the stringers 56 and 57.

While I have shown and described some preferred embodiments of my invention, it will be understood that it is not to be limited to all of the details shown, but is capable of modification and variation within the spirit of the invention and within the scope of the claims.

What I claim is:

1. A device for loading and transporting stacked articles, said device comprising a lower frame member of substantially rectangular shape having upstanding bordering flanges along its edges, an upper frame member of substantially rectangular shape having downwardly projecting bordering flanges along its edges, leg elements projecting upwardly from the lower member and downwardly from the upper member, the leg elements of one member slidably receiving therein the leg elements of the other member whereby the leg elements telescope together to provide extensible connections between said members, and the leg elements of one member being pivoted thereto adjacent to and within the flanges thereof.

2. A device for loading and transporting stacked articles, said device comprising a lower frame member of substantially rectangular shape having upstanding bordering flanges along its edges, an upper frame member of substantially rectangular shape having downwardly projecting bordering flanges along its edges, leg elements projecting upwardly from the lower member and downwardly from the upper member, said leg elements telescoping together to provide extensible connections between said members, the leg elements of one member being pivoted thereto adjacent to and within the flanges thereof, and means on said one member for holding said leg elements in positions in which they project vertically from the frame member with which they are associated.

3. A device for transporting stacked articles comprising a lower frame member of substantially rectangular form, an upper frame member of similar form, leg elements pivoted to each of said frame members and projecting toward the other member, the leg elements of one member being telescopically received within those of the other member to provide an extensible rigid connection between said members and each frame member having bordering flanges within which lie the pivot points of the leg members.

4. A device for transporting stacked articles comprising a lower frame member of substantially rectangular form, an upper frame member of similar form, leg elements pivoted to each of said frame members and projecting toward the other member, the leg elements of one member being telescopically received within those of the other member to provide an extensible rigid connection between said members, said leg elements being pivoted to the frame members with which they are associated to be folded thereagainst when the device is collapsed for shipment, and each of said frame members having vertically disposed flanges extending along the outer edges thereof and projecting toward the other member, which flanges are disposed outwardly of the pivots of said leg elements and are adapted to abut when the device is collapsed whereby the leg elements when folded are enclosed within said flanges.

5. A container or like device for transporting stacked articles comprising a lower frame member, an intermediate frame member and an upper frame member, leg elements pivotally secured to said upper and lower frame members and adapted to stand in a vertical position projecting toward the intermediate frame member, means on the intermediate frame member projecting toward the upper and lower frame members and adapted to be telescopically engaged with the leg elements of the upper and lower frame members to provide rigid extensible connections between said members, and means on the intermediate frame member overlying the articles on the lower member and underlying the articles on the upper member.

6. A container or like device for transporting stacked articles comprising a lower frame member, an intermediate frame member and an upper frame member, leg elements pivotally secured to said upper and lower frame members and adapted to stand in a vertical position projecting toward the intermediate frame member, means on the intermediate frame member projecting toward the upper and lower frame members and adapted to be telescopically engaged with the leg elements of the upper and lower frame members to provide rigid extensible connections between said members, and means on the upper and lower members for securing certain of said leg elements in vertical projecting position.

7. A device for transporting stacked articles comprising a lower section, an intermediate section and an upper section, said upper and lower sections having side flanges projecting downwardly and upwardly respectively, said intermediate section having flanges projecting toward each of the other sections, leg elements pivoted to the lower section and adapted to project vertically upwardly therefrom, leg elements pivoted to said intermediate section and adapted to project both upwardly and downwardly therefrom, leg elements pivoted to the upper section and adapted to project downwardly therefrom, and the leg elements of the intermediate section being slidably engaged with those of the upper and lower sections.

8. A device for transporting stacked articles comprising a lower section, an intermediate section and an upper section, said upper and lower sections having side flanges projecting downwardly and upwardly respectively, said intermediate section having flanges projecting toward each of the other sections, leg elements pivoted to the lower section and adapted to project vertically upwardly therefrom, leg elements pivoted to said intermediate section and adapted to project both upwardly and downwardly therefrom, leg elements pivoted to the upper section and adapted to project downwardly therefrom, the leg elements of the intermediate section being slidably engaged with those of the upper and lower sections, and extensible brace members for holding certain of said leg members in projecting positions.

9. A device for transporting stacked articles comprising a lower frame member having leg elements pivoted thereto so as to be swung to a substantially vertical position with respect thereto, an intermediate section having sleeve elements secured thereto open at both ends, an upper frame member having leg elements pivoted thereto to project downwardly therefrom, the leg elements of the upper and lower frame members being received within the sleeves of the intermediate frame members, and the legs of the lower frame member being telescopically engaged with those of the upper frame member.

10. A device for transporting stacked articles comprising a lower frame member having leg elements pivoted thereto so as to be swung to a substantially vertical position with respect thereto, an intermediate section having sleeve elements secured thereto open at both ends, an upper frame member having leg elements pivoted thereto to project downwardly therefrom, the leg elements of the upper and lower frame members being received within the sleeves of the intermediate frame members, the legs of the lower frame member being telescopically engaged with those of the upper frame member, and each of said frame members being provided with vertically directed flanges, whereby the leg members may be folded to positions to within the flanges to enable compact disposition of the parts for shipment when the device is not in use.

RUDOLPH GONDAR.

REFERENCES CITED

The following references are of record in the file of this patent:

UNITED STATES PATENTS

| Number | Name | Date |
| --- | --- | --- |
| 719,891 | Shocklin et al. | Feb. 3, 1903 |
| 1,038,923 | Mathy | Sept. 17, 1912 |
| 1,742,738 | Turner | Jan. 7, 1930 |
| 1,771,264 | Marrits | July 22, 1930 |
| 1,952,627 | Karper | Mar. 27, 1934 |
| 2,000,067 | Di Mauro | May 7, 1935 |
| 2,249,189 | Thimm | July 15, 1941 |
| 2,292,310 | Wilkins | Aug. 4, 1942 |
| 2,340,540 | Lange | Feb. 1, 1944 |
| 2,371,878 | Cruickshank | Mar. 20, 1945 |
| 2,388,730 | Fallert | Nov. 13, 1945 |

FOREIGN PATENTS

| Number | Country | Date |
| --- | --- | --- |
| 474,889 | Germany | Apr. 13, 1929 |